United States Patent
Martin et al.

(10) Patent No.: US 7,567,364 B2
(45) Date of Patent: Jul. 28, 2009

(54) PULL MODEL NETWORK IMAGE SCANNING SYSTEM

(75) Inventors: Nathaniel G. Martin, Rochester, NY (US); Paul R. Austin, Webster, NY (US); William K. Stumbo, Fairport, NY (US); Wendell L. Kibler, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 931 days.

(21) Appl. No.: 10/995,972

(22) Filed: Nov. 23, 2004

(65) Prior Publication Data

US 2006/0109518 A1 May 25, 2006

(51) Int. Cl.
*H04N 1/00* (2006.01)
*G06F 15/00* (2006.01)

(52) U.S. Cl. .................. 358/402; 358/474

(58) Field of Classification Search ........... 358/402, 358/400, 1.15, 448, 494, 505, 474; 709/201, 709/213, 217
See application file for complete search history.

(56) References Cited

U.S. PATENT DOCUMENTS

| | | | |
|---|---|---|---|
| 5,680,223 A | 10/1997 | Cooper et al. | |
| 6,043,819 A | 3/2000 | LeBrun et al. | |
| 6,134,595 A | 10/2000 | Huang et al. | |
| 6,148,330 A | 11/2000 | Puri et al. | |
| 6,151,426 A | 11/2000 | Lee et al. | |
| 6,151,676 A | 11/2000 | Cuccia et al. | |
| 6,167,462 A | 12/2000 | Davis et al. | |
| 6,424,426 B1* | 7/2002 | Henry | 358/1.15 |
| 6,427,032 B1* | 7/2002 | Irons et al. | 382/306 |
| 7,120,910 B2* | 10/2006 | Matsuda et al. | 718/102 |
| 2002/0018245 A1* | 2/2002 | Saito et al. | 358/468 |
| 2002/0161476 A1* | 10/2002 | Panofsky et al. | 700/231 |
| 2002/0191222 A1* | 12/2002 | Miyamura et al. | 358/402 |
| 2003/0172304 A1* | 9/2003 | Henry et al. | 713/201 |
| 2004/0159700 A1* | 8/2004 | Khan et al. | 235/380 |

* cited by examiner

*Primary Examiner*—Gabriel I Garcia
(74) *Attorney, Agent, or Firm*—Michael J. Nickerson; Basch & Nickerson LLP

(57) ABSTRACT

A system generates an electronic image of a document for later retrieval through a network connection. The system uses a network accessible scanning device to enable scanning of a document to generate an electronic image thereof and an electronic repository to electronically store the electronic image. The electronic repository designates an electronic address for the stored electronic image and communicates the electronic address to the network accessible scanning device. The network accessible scanning device provides information to a user scanning the document. The information relates to the electronic repository designated address.

7 Claims, 2 Drawing Sheets

PULL MODEL NETWORK IMAGE SCANNING SYSTEM

BACKGROUND AND SUMMARY

Conventionally, image scanners have been a peripheral apparatus for a computer. Though the computer may be attached to the network, the scanner usually is not. Therefore, to use the scanner in a networked environment, the person wishing to use the scanner must also use the computer. Where scanning is a common practice, this arrangement works well. However, where people scan infrequently, the increased difficulty of using an unfamiliar computer coupled with the difficulty of scanning itself makes the process unwieldy.

In this scenario, as illustrated in FIG. 1, a network scanner 10 is connected to a local area network through a personal computer 14. At the scanning device 10, the user inputs the destination to which the image is to be uploaded. Typically, this is another personal computer 16 connected to the local area network. Thereafter, the network scanner 10 pushes the image data to the desired location.

Recently, digital copiers, wherein the digital copier comprises a scanner, a printer, and a computer to control the scanner and printer, have replaced many of the older analog copiers, wherein the analog copiers use optics to create a xerographic image on a single piece of paper. Because digital copiers contain a printer, the digital copiers are often connected directly to the network to create a multi-function device. The multi-function device serves as a network printer, a walk-up copier, and network scanner. The advent of the multi-function device has made network scanners relatively common in situations where scanning is an infrequent activity.

The most common approach to providing network scanning, particularly on a scanner associated with a multi-function device, is to have the user provide the device with information, often the user's email address, which allows the multi-function device to send the electronic document created by the scanner to a location where the user can retrieve it. Infrequent scan users often forget what information the system needs and how to give the system the information.

Another conventional system for network scanning involves printing a cover sheet that contains the information the networked scanner needs to deliver the scanned document. The user creates such a sheet by accessing a server and providing the necessary information. This step is relatively easy because the user accesses the server from their own, familiar computer. The cover sheet is scanned with the document and the system reads the information from the sheet. This conventional system is an improvement over users providing the information to the system each time the user scans a document, because the necessary information is contained in a physical form obviating the need for the user to remember the information.

The various conventional systems discussed above use a push model in which the device delivers the documents to the user. This model requires the user to designate the destination of the image data. Such designation information may not always be available to the user at the time of scanning. Even if the information is available to the user, users may not know how to specify the information to the device.

In an example of a conventional pull model in which the device stores the electronic documents for later retrieval by the user, a network scanner may include "mailboxes" associated with the device. In this example, the system requires users to specify a "mail box" into which the files are stored and then the file may be named with a cryptic string composed from data associated with the date and time of scanning. Users retrieve the data from the "mailbox" by accessing it from their personal computer In such a system, a user chooses from the set of mailboxes, the one the user wants the electronic file to be placed in. Some mailboxes may allow unlimited access, thereby allowing anyone to access the file; while other mailboxes may have limited access, thereby providing some type of security as to who is allowed to access the file. This allows the mailboxes to be assigned to specific users so that the users can select passwords for the mailboxes to limit the people who can access the files.

However, this system still encounters problems. For example, users must know the allocation of the mailboxes to users before scanning. Limiting the number of locations simplifies task of routing the information. Unfortunately, limiting the number of locations also limits the flexibility of the system; only a fixed number of people can have secure mail boxes. Moreover, increasing the number of mailboxes so as to increase flexibility does not resolve the problem because the increase in the number of mailboxes makes it more difficult to specify the correct mailbox.

Therefore, it is desirable to provide a network scanning system that increases access flexibility as well as security for all users.

Furthermore, it is desirable to provide flexibility and security through a network scanning system associated with a repository to enable the capture of scanned documents which can be later downloaded through a user's workstation or other network accessible device using a conventional browser.

Moreover, it is desirable to provide a network scanning system that avoids having the users provide routing information to the device, but which stores the document and provides users with information that allows the user to download the data.

Lastly, it is desirable to provide a network scanning system that provides a scanning workflow that is similar to the conventional copy workflow wherein the user inserts the document and the device leaves the resulting electronic copy in an electronic "output tray." The electronic "output tray" represents the electronic location of the scanned document, such as memory location or address within an electronic repository.

A method of generating an electronic image of a document for later retrieval through a network connection scans a document to generate an electronic image thereof; stores the electronic image at a system designated location; and provides information to a user scanning the document, the information relating to the system designated location.

A system for generating an electronic image of a document for later retrieval through a network connection includes a network accessible scanning device to enable scanning of a document to generate an electronic image thereof and an electronic repository to electronically store the electronic image. The electronic repository designates an electronic address for the stored electronic image and communicates the electronic address to the network accessible scanning device. The network accessible scanning device provides information to a user scanning the document. The information relates to the electronic repository designated address.

BRIEF DESCRIPTION OF THE DRAWINGS

The drawings are only for purposes of illustrating embodiments and are not to be construed as limiting, wherein.

DETAILED DESCRIPTION

Figure 1:
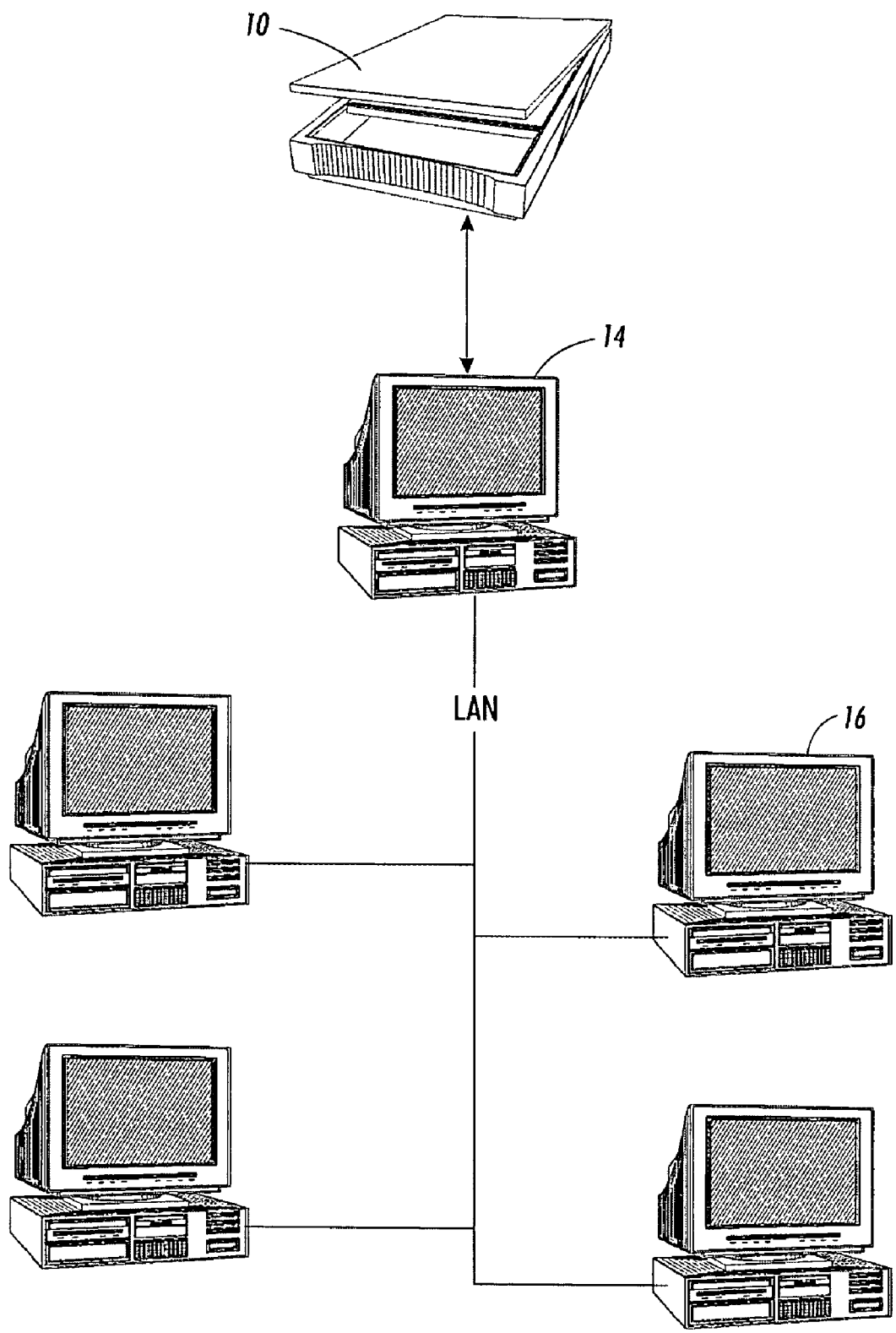
FIG. 1 illustrates a block diagram of a conventional image capture system.

For a general understanding, reference is made to the drawings. In the drawings, like reference have been used throughout to designate identical or equivalent elements. It is also noted that the various drawings are not drawn to scale and that certain regions have been purposely drawn disproportionately so that the features and concepts could be properly illustrated.

Figure 2:
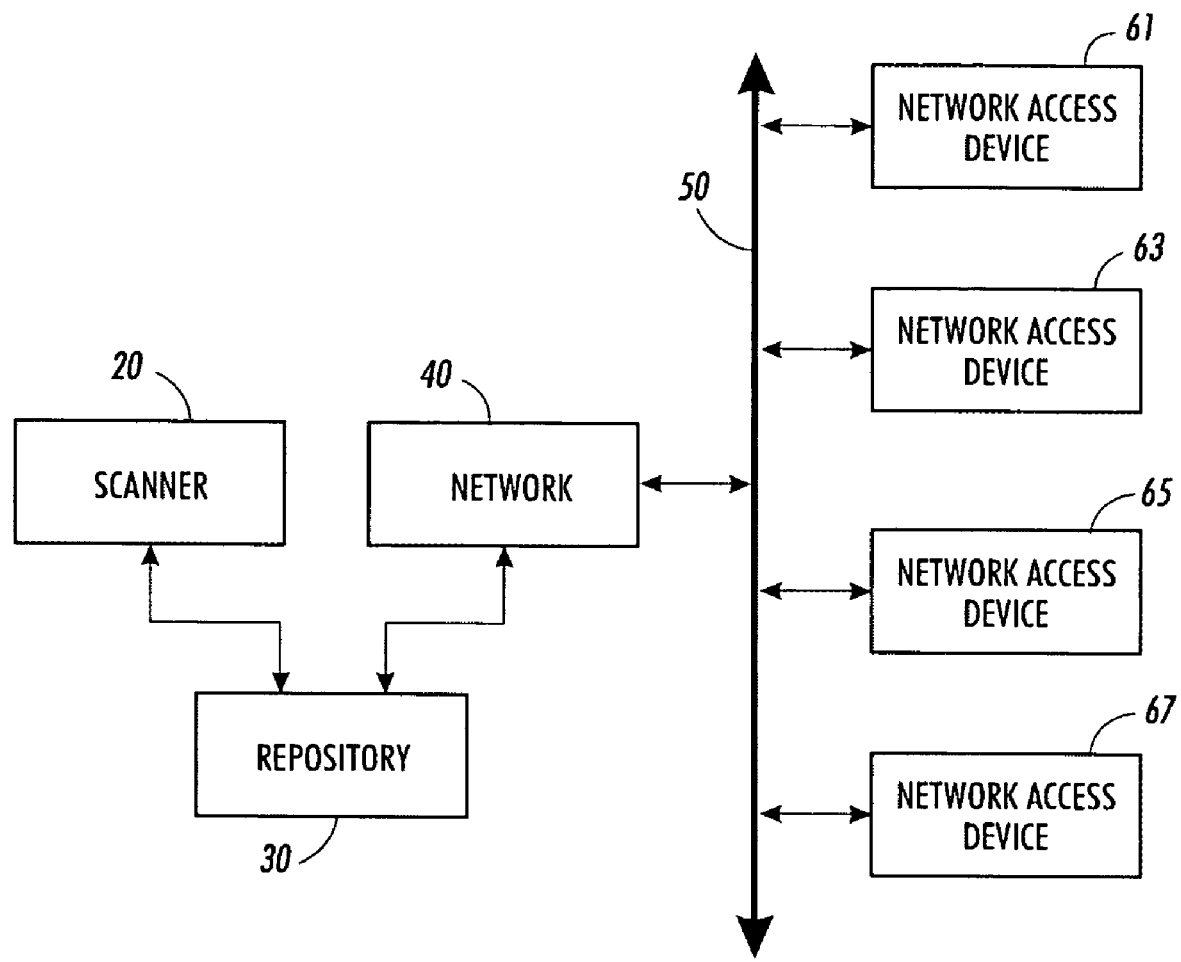
FIG. 2 is a block diagram of an image capture system that enables the capture of scanned documents which can be later downloaded through a user's workstation or other network accessible device using a conventional browser.

As noted above, a network accessible scanning device is augmented with an electronic repository. As illustrated in FIG. 2, the network accessible scanning device 20 is connected to an electronic repository 30. It is noted that the electronic repository 30 may physically reside in the network accessible scanning device 20 or be located remotely of the network accessible scanning device 20, such as off-site in a secured facility. In such a remote location, the network accessible scanning device 20 may actually be connected to the electronic repository 30 via a network (not shown). In addition, multiple scanning devices can be connected to a single document repository. If the multiple scanning devices are connected to a single document repository, the network accessible scanning device will be connected to the electronic repository via a network (not shown).

The electronic repository 30 is connected to a network 40. This network may be a local area network, a wide area network, and/or the internet. The network 40 enables the user to be able to access the electronic repository 30 via a network access device (61, 63, 65, or 67). The access may be through a conventional web browser. The network access device (61, 63, 65, or 67) may be a networked personal computer, personal digital assistant, cellphone, or other computing device that is capable of accessing a network 50.

In FIG. 2, network accessible scanning device 20 scans a document to generate an electronic image thereof. The electronic image is stored, within the electronic repository 30, at a system designated location. The electronic repository 30 provides information to the user scanning the document, this information being related to the system designated storage location.

The information relating to the system designated storage location may be displayed on a display screen which may be part of a user interface. The information relating to the system designated storage location may also be printed by a printing device that is either connected to the network accessible scanning device 20 or is integral with the network accessible scanning device 20. It is also noted that the information relating to the system designated storage location may be sent to the user in a manner specified by the user through the user interface of the network accessible scanning device 20.

It is further noted that the electronic image may be securely stored at the system designated storage location and the user is provided a password to enable retrieval of the secured document. In this instance, the information relating to the system designated storage location and password may be displayed on a display screen which may be part of a user interface. The information relating to the system designated storage location and password may also be printed by a printing device that is either connected to the network accessible scanning device 20 or is integral with the network accessible scanning device 20. It is also noted that the information relating to the system designated storage location and password may be sent to the user in a manner designated through the user interface of the network accessible scanning device 20.

Moreover, it is noted that the electronic image may be encrypted at the system designated storage location and the user is provided a digital key to enable decryption of the stored document. In this instance, the information relating to the system designated storage location and digital key may be displayed on a display screen which may be part of a user interface. The information relating to the system designated storage location and digital key may also be printed by a printing device that is either connected to the network accessible scanning device 20 or is integral with the network accessible scanning device 20. It is also noted that the information relating to the system designated storage location and digital key may be sent to the user in a manner specified by the user through the user interface of the network accessible scanning device 20.

Furthermore, it is noted that the electronic image may be securely stored and encrypted at the system designated storage location and the user is provided a password and a digital key to enable decryption of the stored document. In this instance, the information relating to the system designated storage location, password, and digital key may be sent to the user in a manner the user specifies through the user interface of the network accessible scanning device 20.

It is also noted that network accessible scanning device 20 may include the capability of identifying a user scanning the document. This identification feature may be a bio-identification device, such as a hand reader, a fingerprint reader, an iris scanner, and/or a facial scanner. On the other hand, the identification feature may be a user/password recognition feature and/or keycard reader. In all these instances, the electronic repository 30 uses the identification information to create and store the electronic image at a system designated location corresponding to the identification of the user scanning the document so as to store the electronic image at the system. It is noted that these system designated locations may be collections that have pre-defined user authorizations.

As further illustrated in FIG. 2, network access device (61, 63, 65, or 67) may access the electronic repository 30, through a conventional web browser, to view the scanned document, download the document to the user's network access device, and/or download the electronic file (image) to another user defined designation.

As noted above, the network accessible scanning device 20 may have a web server, acting as the electronic repository, which stores scanned images until the user picks them up. Moreover, the network accessible scanning device 20 may be a networked multifunction device. When a document is scanned, the device stores the image on its disk and adds a link to the image on a page in the web server.

In practice, a system administrator may set up the network accessible scanning device 20 either by assigning it a static IP address and entering its name in domain's name registry, or by permitting the machine to register via DHCP.

If the system administrator is concerned about the security of the images scanned, the system administrator can set up the network accessible scanning device 20 so it puts the file in a directory that requires a password. Alternatively, the system administrator can set up the machine so that it encrypts the file before storing it on the disk.

The user operates the network accessible scanning device 20 so as to cause it to produce an electronic image thereof. The network accessible scanning device 20 may print a confirmation sheet that tells the user where the document will be in the web server and optionally password information needed to access or decrypt the image.

Alternatively, the network accessible scanning device 20 may be able to send email to the user containing the storage address and/or password, requiring the user to enter a proper e-mail address.

If the network accessible scanning device 20 enables the users to identify themselves to the network accessible scanning device 20, the network accessible scanning device 20 can store the file in a location specified by a user's preferences entered into the repository. These preferences can specify the collection into which the scanned images should be placed, the access allowed to the image, the encryption to be applied to the images. The user preferences can also apply transforms to the image. For example, the image could be optically character recognized, translated, summarized, compressed, or changed to a different file format.

The user retrieves the image through a browser pointed at the name or IP address of the electronic repository. The web server provides the page with links to the image scanned from the document. If the image is password protected, the user enters a password. The image is delivered to the user using HTTP protocol, the same way any web page is delivered. If the machine has encrypted the file, the user decrypts using the password or digital key supplied by the network accessible scanning device.

As noted above, the user will need to find the image on the repository, which may be made accessible through a web server.

One option is for the documents to be stored and indexed by a thumbnail of the image of the first page of the document. The users can then find the file by looking for the thumbnail. One way of assisting the recognition of a thumbnail is for the user to provide a special first sheet, when scanning. This special first sheet would have identifying information written on it in large letters that would be visible on the thumbnail.

Another option is for the document to be stored and indexed by a simple title that the user may give to the scanned document. The user would find the file by looking for the simple title. To assist the user in this situation, the simple title may be printed on a medium along with the location information.

A further option is for the document to be stored and indexed by a title that the system generates from an analysis of the scanned document. This analysis may be carried out upon the results of an optical character recognition process being performed upon the scanned document to generate a document related title. The user would find the file by looking for the system generated title. To assist the user in this situation, the system generated title may be printed on a medium along with the location information.

A still further option is for the document to be stored and indexed by a title that the system generates from information corresponding to the date and time of scanning. The user would find the file by looking for the time dependent title. To assist the user in this situation, the time dependent title may be printed on a medium along with the location information.

Alternatively, as discussed above, the network accessible scanning device can provide a confirmation sheet after the scan that gives the URL to the document. Using this technique, the network accessible scanning device could provide some access security to the document. Only the person holding the confirmation sheet would know the location of the document. If additional security is needed, the network accessible scanning device could encrypt the file and provide the decryption key on the confirmation sheet or via e-mail.

In addition, the network accessible scanning device could provide a platform for delivering other functions; such as, rotating the image upright, translating from one format to another, and/or performing optical character recognition. This eliminates or greatly reduces the requirement that users install imaging software on personal computers, enabling use of scanned images to be controlled from limited-functionality devices such as cell phones or personal digital assistants. Additional services provided by the network accessible scanning device may include translation, summarization, and automatic keyword extraction.

Finally, one of the problems with supplying a repository in a network accessible scanning device that can scan is that the repository may quickly fill up with outdated documents. A mechanism for implementing a policy that manages these files can be added to the repository. For example, the administrator may designate a policy by which documents are deleted after being in the default collection (i.e. directory or folder) for scanned files after a month. A user could specify a policy that after a day, the files in his or her repository are archived.

In summary, the present scanning system may provide a thumbnail representation of the first sheet of the scanned image as the title of the image file resulting from the scan. Moreover, the present scanning system may provide user preferences on the document repository that allow scanning to a particular collection if the user identified himself or herself at the machine; the capability in the user preferences to indicate particular transforms to apply to the image before it is stored in the repository; a platform for providing services such as a web services interface; and/or a printed scan confirmation that informs the user of where the scanned image will be found.

Furthermore, the present scanning system may provide a printed scan confirmation that gives a password to access the scanned image; a printed scan confirmation that gives a password to decrypt the image; and/or a mechanism for specify a time based policy on the storage of documents in collections or with certain properties. The user may be allowed to specify policies that are more restrictive than the policies set by the administrator on collections or files with particular properties.

Moreover, since the documents that the network scanner produces are electronic, there is more flexibility in the location of the electronic "output tray" than there is with the paper documents a copier produces.

For example, a copy machine indicates the location of the output tray by its physical design: the place the paper shows up is the output tray. A networked scanner can indicate the location of its "output tray" by, for example, indicating on the machine the Uniform Resource Locator of the document collection into which it will put the electronic documents. This indication could be permanent, such as the Uniform Resource Locator being painted on the side, or temporary, such as the Uniform Resource Locator being displayed on an electronic display.

Also, since the most common existing networked device that includes a scanner is a multi-function device, networked scanners often have a printer associated or attached therewith. These network scanners that are attached to printers can provide the needed location information, information relating to the location of the electronic "output tray," to users, by printing a paper that contains the location information.

In a multi-function device, the scanning workflow is very similar to the copy workflow wherein users put the document to be scanned in the document feeder or on the platen; the user pushes the button to start the machine; and the machine produces a piece of paper that tells the user how to access the newly created electronic document.

While various examples and embodiments have been shown and described, it will be appreciated by those skilled in the art that the spirit and scope of the descriptions are not limited to the specific description and drawings herein, but extend to various modifications and changes.

What is claimed is:

1. A system for generating an electronic image of a document for later retrieval, by a user generating the electronic image of a document, through a network connection, comprising:

a network accessible document scanning device to enable scanning of a document to generate an electronic image thereof;

said network accessible document scanning device including a printing device to print human readable information on a removable physical medium; and an electronic repository, operatively connected to said network accessible document scanning device, to electronically store the electronic image;

said electronic repository designating an electronic address for the stored electronic image;

said electronic repository communicating said designated electronic address to said network accessible document scanning device, the designated electronic address being an address from which the user generating the electronic image of the document can retrieve the electronic image of the document from said electronic repository;

said printing device printing, on said portable removable physical medium, human readable information, said human readable information relating to the electronic repository designated electronic address, said human readable information enabling the user generating the electronic image of the document the ability to retrieve the electronic image of the document from said electronic repository.

2. The system as claimed in claim 1, wherein said removable physical medium is paper.

3. The system as claimed in claim 1, wherein the electronic image is securely stored at said designated electronic address and the user is provided a password to enable retrieval of the secured document.

4. The system as claimed in claim 3, wherein the information related said designated electronic address and the password are printed on said portable removable physical medium for the user to take therewith.

5. The system as claimed in claim 1, wherein the electronic image is encrypted and stored at said designated electronic address and the user is provided a key to enable decryption of the retrieved document.

6. The system as claimed in claim 1, wherein said network accessible scanning device identifies a user scanning the document such that the electronic image is stored at a designated electronic address corresponding to the identification of the user scanning the document.

7. The system as claimed in claim 1, wherein the electronic image is encrypted and securely stored at said designated electronic address and the user is provided a password to enable retrieval of the secured document and a key to enable decryption of the retrieved document.

* * * * *